Figures 1, 2:
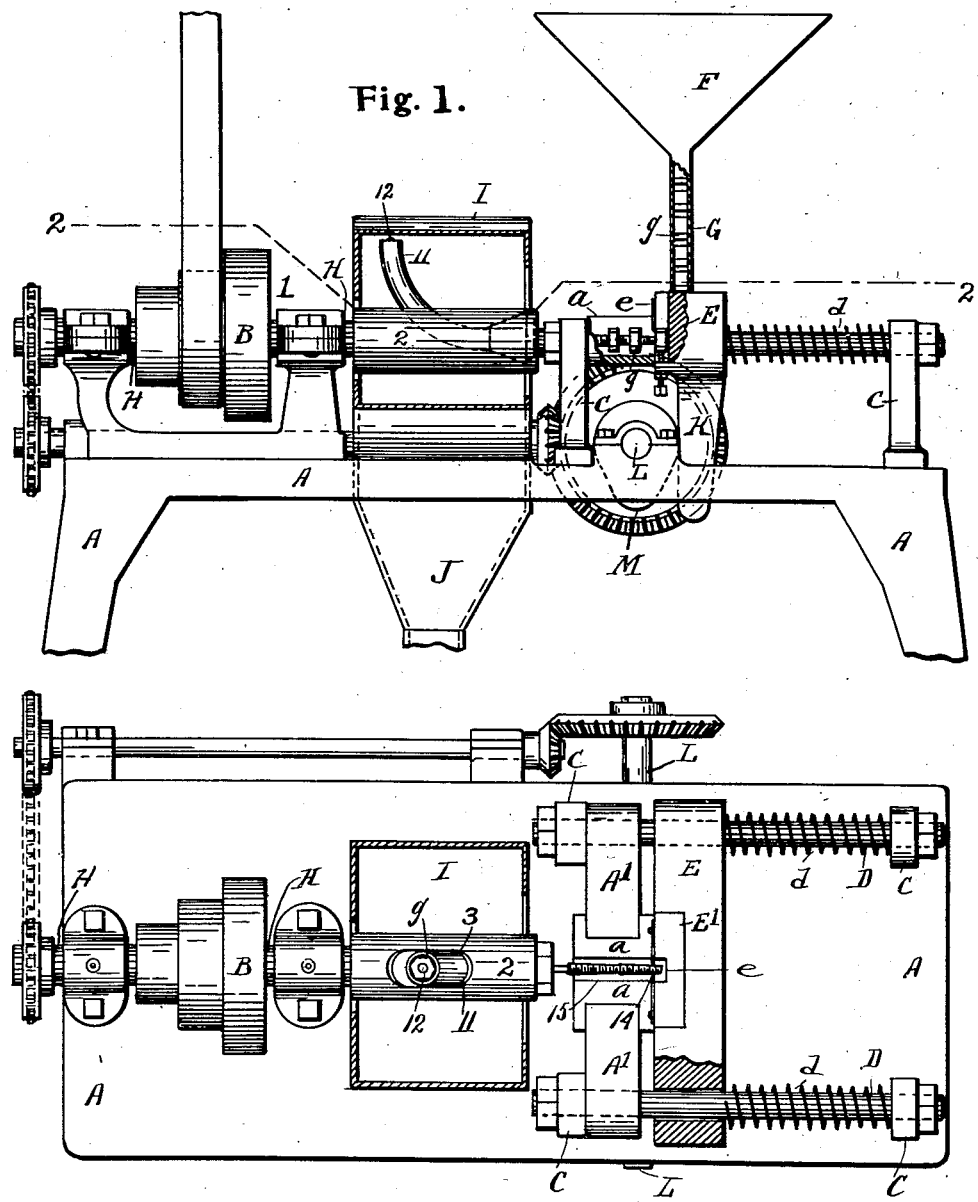

A. H. BRAY.
APPARATUS FOR THREADING NUTS.
APPLICATION FILED SEPT. 11, 1909.

999,090.

Patented July 25, 1911.
2 SHEETS—SHEET 1.

Witnesses
O. B. Baenziger.
Clarence E. Doy.

Inventor
Albert H. Bray.
By Parker & Burton
Attorneys

A. H. BRAY.
APPARATUS FOR THREADING NUTS.
APPLICATION FILED SEPT. 11, 1909.
999,090.
Patented July 25, 1911.
2 SHEETS—SHEET 2.
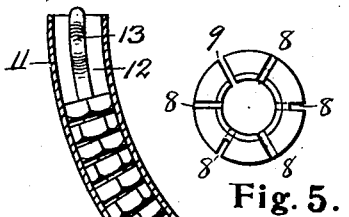
Fig. 5.
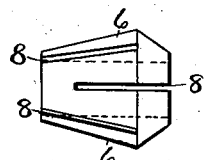
Fig. 4.
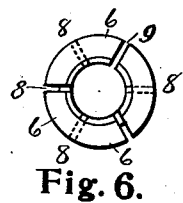
Fig. 6.
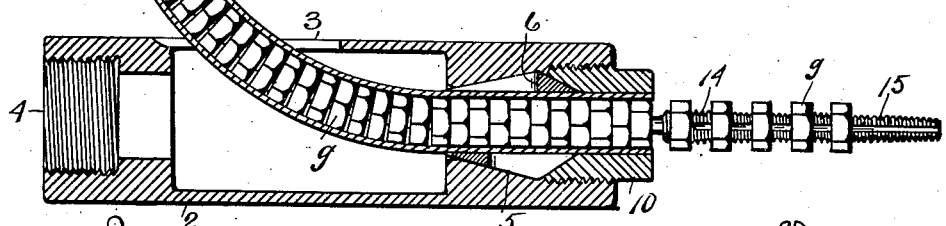
Fig. 3.
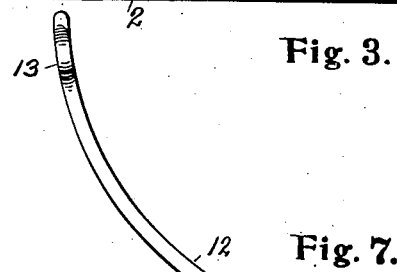
Fig. 7.
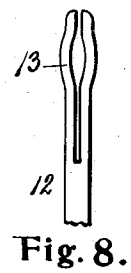
Fig. 8.
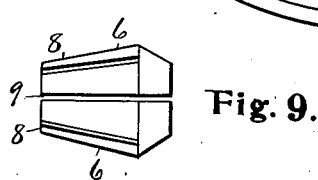
Fig. 9.
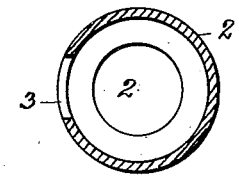
Fig. 10.    Fig. 11.
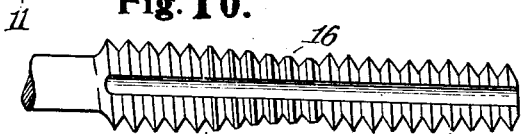
Fig. 12.
Witnesses
O. B. Baenziger
Clarence E. Day
Inventor
Albert H. Bray
By Parker & Burton
Attorneys

UNITED STATES PATENT OFFICE.

ALBERT H. BRAY, OF DETROIT, MICHIGAN, ASSIGNOR TO DETROIT SCREW WORKS, OF DETROIT, MICHIGAN, A CORPORATION.

APPARATUS FOR THREADING NUTS.

999,090.

Specification of Letters Patent.   Patented July 25, 1911.

Application filed September 11, 1909. Serial No. 517,234.

*To all whom it may concern:*

Be it known that I, ALBERT H. BRAY, a citizen of the United States, residing at Detroit, county of Wayne, and State of Michigan, have invented a certain new and useful Improvement in Apparatus for Threading Nuts, and declare the following to be a full, clear, and exact description of the same, such as will enable others skilled in the art to which it pertains to make and use the same, reference being had to the accompanying drawings, which form a part of this specification.

My invention relates to apparatus for threading nuts and consists in the improvements hereinafter described and pointed out in the claims.

In the accompanying drawing,—Figure 1 is an elevation partly in section of an apparatus embodying my invention. Fig. 2 is a plan view of the same, partly in section, the hopper and conducting trough being removed. Fig. 3 is a section of the holder and adjacent parts. Fig. 4 is an elevation of the clamping collet. Fig. 5 is an end view of the same looking from the left of Fig. 4. Fig. 6 is an end view of the same looking from the right of Fig. 4. Fig. 7 is a view representing the tap and its curved shank. Fig. 8 is a detail view of the end of the shank. Fig. 9 is an elevation of the collet turned to a different position from that shown in Fig. 4, showing one slot cut completely through the side from end to end. Fig. 10 is a top plan view of the holder, and Fig. 11 is a section on the line 11—11 Fig. 10. Fig. 12 is a detail view showing the end of the tap to an enlarged scale.

A, A, is the supporting frame upon which is carried in bearings a spindle H with a pulley B thereon.

C, C are standards rising from the frame A, between which standards extend guide rods D, D.

E is a cross head adapted to reciprocate on the guide rods, D, D.

$d$, $d$, are light helical springs which surround the guide rods D, D and act to force the cross head E toward the left.

$A^1$ is a support extending between the left hand ends of the rods D, D and carrying a die $a$, through the center of which is a slot or aperture in which the nuts may pass, but so shaped and of such a size as to prevent the rotation of said nuts.

F is a hopper into which the blank nuts are thrown to be fed through a trough G to the feeding apparatus hereinafter described.

I is a cylindrical casing secured to the frame work A into which casing the threaded nuts are thrown to be fed through a delivery spout J to a convenient receptacle.

K is a lug extending downward from the cross head E.

L is a shaft resting in bearings supported by the framework A.

M is a cam on the shaft L, adapted to contact the lug K to reciprocate the cross head E.

$E^1$ is a hardened metal die fitted into the cross head E and provided with a slot $e$ adapted to receive the nuts from the trough G, and feed them to the tap, as hereinafter described.

2 is a cylindrical holder provided at one end with internal screw-threads 4, adapted to engage screw-threads upon the inner end of the spindle H to secure said holder in operative position.

3 is an aperture formed through the side of the holder 2.

5 indicates a conical surface which tapers inward and is located toward one end of the holder 2.

6 is a ring or collet having two conical surfaces, one of which is adapted to fit against the surface 5. The collet 6 is slotted in radial planes through its axis, as indicated; one slot 9 extends clear through one wall, the other slots 8 extend partly through one set from one end, and the other set from the other end, so that said collet readily contracts in diameter when forced inward along the conical surfaces 5.

10 is a nut provided with external screw-threads adapted to engage the screw-threads in the holder 2, and having its inner end formed to fit upon the outer end of the collet 6, as shown in Fig. 3.

11 is a tube of an internal diameter about equal to, or a little larger than the largest diameter of the nuts to be tapped. In use, the tube 11 is secured in the holder 2 with its front end in axial alinement with said holder and extending into desired proximity to the die a, which can be conveniently effected by inserting the end of said tube into the hole or opening through the collet 6 and clamping said collet upon said tube by setting up the nut 10. The curved end of said tube extends through the aperture 3. It is desirable that the tube 11 shall be of such a shape that it will support the tap and nuts thereon, that is that it should not be straight or a circle of one radius throughout.

12 is a tap formed with its cutting edges 14 and 15 at one end and with a curved shank of the shape of the tube 11, which tap is placed axially in the tube 11, as indicated in Fig. 3. The portion of the tap having cutting edges 14 and 15 upon it, extends so close to the end of the tube that a nut will have entered said tube before leaving the cutting threads. The nuts g are in the first place placed upon the smooth shank of the tap 12 within the tube 11 and hold said tap centered in the tube. The outer end of the tap, or that which is adjacent to the open end of the tube 11, that extends laterally from the holder 2, is split, as represented at 13 in Fig. 8 and is spread apart so as to hold the nuts on with a yielding action, so that the nuts may be forced off but will not fall off of their own accord.

With the tube 11 and tap 12 in position as indicated in Fig. 3, the holder is placed upon the live spindle H of the apparatus, and said spindle is set to rotating, carrying the tube 11 and tap 12 with it because of the laterally extending end of said tube acted upon by the wall of the slot 3, and the bent portion of the shank of said tap acted upon by the adjacent walls of the tube through the centering interposed nuts. The cross head E is reciprocated by the spring d, the cam M and lug K. When said cross head is at its right hand position, the aperture e comes directly below the mouth of the trough G and a nut drops into said aperture. The cross head E is then allowed to move forward under the impulse of the springs d, d, presenting the nut blank to the small end 15 of the threaded tap, which begins to form the thread, drawing the nut along upon it into the aperture or slot in the holder a, which prevents the rotation of the nut blank, which blank is gradually drawn along the threaded portions 15 and 14 of the tap 12. From the threaded portion of the tap the finished nuts pass onto the unthreaded shank of the tap, along which they are forced by succeeding nuts. When the shank is filled from end to end, every nut which passes from the threaded portion of the tap onto the shank thereof will operate to force a nut off from the opposite end of said shank into the casing I, whence it will fall through the spout J. With a machine of the described construction and method of operation, it is obvious that nuts may be threaded as a continuous operation with no attention from the operator other than to keep the hopper supplied with blanks.

The threaded end of the tap 12 is divided into two portions 14 and 15 by cutting away the outer portions of the intermediate threads, leaving enough of the intermediate thread to feed the nut along, but doing no cutting. Thus the hardest cuts, at the beginning and finishing of the operation, are done alternately, while the hard cut is being done at 15, the preceding nut is being fed along without cutting at the intermediate portion 16 and when the easier portion of the initial cut is being formed by the part 15, the preceding nut is upon the part 14, which is doing the heaviest part of the finishing cut.

It will be noticed that a tube 11 of one diameter adapted to one size of nuts may be easily removed and replaced by a tube of another diameter and adapted to another size of nuts, or a second holder may be used with its tube, inclosed tap and collet.

The simplicity of the above described device will be noticed, and it will be seen that is requires no special actuating machinery, but on the contrary may be secured to the live spindle of usual machine tools, such as lathes, drill presses, etc.

Claims:—

1. In a nut tapping machine, a holder having a curved passage therein, co-axial with said holder at one end, and opening at the side of said holder at the other end, a tap having a shank shaped to conform to the shape of said passage located in said passage, constructed and arranged to be held in place in said passage by nuts on said shank.

2. In a nut tapping machine, a holder having a passage therein, a curved tube located in said passage, a tap having its shank shaped to conform to said tube adapted to hold the same in place in said tube.

3. In a nut tapping machine, a holder having a passage therein, a curved tube located in said passage, a tap having its shank shaped to conform to said tube, adapted to hold the same in place in said tube, and means for securing the said tube in place.

4. In a nut tapping machine, a holder having a passage therein, a curved tube located in said passage, a tap having its shank shaped to conform to said tube adapted to hold the same in place in said tube, and means adjustable to different sized tubes for holding said tube in place.

5. The combination of a holder 2, having the conical surface 5, a tube 11 in said holder, a collet 6 having conical surface adapted to bear against the surface 5, and a nut 10 adapted to force said collet inward to clamp said tube in place.

6. In a device of the kind described, the combination of a holder having an opening at its end, and an opening at its side, a curved tube extending through said openings, and means for securing said tube in place, substantially as and for the purpose described.

7. The combination of a holder having an opening at its end and an opening at its side, a curved tube extending through said openings, a tap, shaped to conform to the shape of said tube, located in said tube, constructed and arranged to be held in place in said passage by nuts on said shank.

8. In a nut tapping machine, a holder having a passage therein comprising sections forming curves of different radii, said passage being co-axial with said holder at one end and opening through the side of said holder at its other end, a tap having a shank shaped to conform to the shape of said passage located in said passage constructed and arranged to be held in place therein by nuts on said shank, substantially as and for the purpose described.

9. The combination of a holder, provided with a passage extending through an end and a side thereof, a tube comprising sections forming curves of different radii in said passage and having its ends adjacent to said openings, and means for securing said tube in position, substantially as and for the purpose described.

10. The combination of a holder provided with a passage extending through a side and an end thereof, a tube comprising straight and curved sections in said passage and having its ends adjacent to said openings and means for securing said tube in position in said passage, substantially as and for the purpose described.

11. In an apparatus of the kind described, a holder having a curved passage therein, a tap shaped to said curved passage, and a tube removably secured in said holder around said tap.

In testimony whereof, I sign this specification in the presence of two witnesses.

ALBERT H. BRAY.

Witnesses:
C. E. JENNINGS,
ELLIOTT J. STODDARD.